Patented June 7, 1938

2,119,515

UNITED STATES PATENT OFFICE 2,119,515

PROCESS FOR THE SEPARATION OF HYDROXY COMPOUNDS OF THE CYCLOPENTANO POLYHYDRO PHENANTHRENE SERIES

Walter Schoeller, Berlin-Westend, Arthur Serini, Berlin, Max Gehrke, Birkenwerder, near Berlin, Hans Priewe, Rangsdorf (Teltow), Lothar Strassberger, Berlin-Wilmersdorf, and Willy Logemann, Berlin-Charlottenburg, Germany, assignors to Schering-Kahlbaum A. G., Berlin, Germany, a corporation of Germany No Drawing. Application March 4, 1936, Serial No. 67,090. In Germany March 19, 1935

20 Claims. (Cl. 260—131)

This invention relates to a process for the separation of hydroxy compounds of the cyclopentano polyhydro phenanthrene series and more particularly to a process for the separation of hydroxy compounds of the androstan series.

One object of the present invention is the separation of the two germinal gland hormones androsterone and dehydro-androsterone a mixture of which is obtained, for instance, by extracting the urine of male individuals in a known manner with organic solvent. Hitherto, the separation of these two substances, the androsterone of the general formula $C_{19}H_{30}O_2$ and the melting point 178° C. and the dehydro-androsterone of the general formula $C_{19}H_{28}O_2$ and the melting point 148° C., was very difficult on account of their very close chemical relationship.

It has now been found that these two substances, the androsterone and the dehydro-androsterone, can be separated and isolated from a mixture containing the same according to this invention in a very simple and convenient manner by treating a solution of the mixture with saponines. Thereby the dehydro-androsterone forms a difficultly soluble addition compound, whereas the androsterone does not combine with the saponine. Hence, the two products, the difficultly soluble addition compound of the dehydro-androsterone and the relatively easily soluble androsterone, can be separated from each other on account of their different solubility, for instance, by filtering off the addition compound precipitated from the solution or by evaporating the reaction solution to dryness and extracting the residue with a solvent wherein the addition compound is insoluble, whereas the androsterone is taken up by the same.

The addition compound separated from the androsterone is thereafter decomposed in a manner known for splitting off saponine addition compounds, for instance, by treating with high boiling liquids, for instance, aromatic hydrocarbons, such as xylene or the like, or with pyridine and the like bases or by other methods, whereby the dehydro-androsterone is obtained in pure form.

The androsterone, on the other hand, can also be recovered in pure form from those portions of the reaction mixture that contain it, for instance, by extraction and the like.

Another object of the present invention consists in the separation of the various isomeric hydroxy ketones androstanolones having the general formula $C_{19}H_{30}O_2$ as they are obtained, for instance, by oxidizing a mixture of isomeric hydrogenated sterols or by partially hydrogenating the saturated and unsaturated diketones androstandiones and androstendione of the general formulas $C_{19}H_{28}O_2$ and $C_{19}H_{26}O_2$ respectively.

Now, according to the present invention, on adding a solution of a saponine to a solution containing a mixture of the isomeric androstanolones and on separating from the reaction mixture the addition compound formed, an androstanolone can be obtained by decomposing the separated addition compound, that is identical with the so-called transandrosterone, an isomer of the natural male sex hormone androsterone. The remainder of the reaction mixture from which the addition compound has been removed contains the isomeric cis-androstanolone or androsterone which can be isolated, for instance, by extracting the remaining reaction mixture or by other methods.

A still further object of the present invention consists in separating from each other the isomeric dialcohols androstandiols having the general formula $C_{19}H_{32}O_2$ as they are obtained, for instance, by completely hydrogenating the saturated and unsaturated diketones androstandiones and androstendione of the general formulas $C_{19}H_{28}O_2$ and $C_{19}H_{26}O_2$ respectively.

According to the present invention, on adding a solution of a saponine to a solution containing a mixture of the isomeric androstandiols and on separating from the reaction mixture the addition compound formed, an androstandiol can be obtained by decomposing the separated addition compound, that is identical with the so-called trans-androstandiol, an isomer of the so-called cis-androstandiol, the hydrogenation product of the male sex hormone androsterone.

Digitonine has proved of special value as saponine employed for carrying out the process of the present invention; but other saponines as, for instance, solamine, cyclamine, dioscine or the like, may likewise be used.

The process of this invention described above may be further illustrated by the following examples without, however, limiting the same thereto.

*Example 1*

In the precipitation of purified hormone oils from the urine of men with the aid of semicarbazide according to the process of German Patent No. 576,713 there is precipitated a difficultly soluble semicarbazone portion which after splitting yields a ketone mixture melting at 130–136° C. 1.8 grams of this mixture are dissolved in 50 ccs. of 96% alcohol and mixed with 400 ccs. of a 2.5% solution of digitonine in 96% alcohol. The reaction mixture is allowed to stand for some hours at room temperature. The white precipitate produced is filtered off, washed with alcohol and dried. Yield 5.5 grams. By treatment with boiling xylene the digitonide can be decomposed into its constituents and from the xylene solution the dehydro-androsterone isolated in colorless crystals. Yield 0.78 gram. Melting point after recrystallization 146-148° C.

The alcoholic solution of the digitonide precipitate is treated with ether and extracted with water. In the aqueous solution is then contained the excess digitonine; from the ethereal layer is recovered by evaporation in good yield the androsterone of M. P. 178° C. (after recrystallization).

Example 2

2 grams of the mixture of saturated dialcohols $C_{19}H_{32}O_2$ obtained by hydrogenating androstandiones or androstendione, are dissolved in 60 ccs. of 96% alcohol and treated with 1000 ccs. of a 1% digitonine solution in 96% alcohol. After about 10 hours standing a white precipitate of digitonide has deposited; it is filtered off and for the purpose of decomposing is dissolved in pyridine. To the pyridine solution is added 10 times the quantity of ether; by this means the digitonine is precipitated; the mother liquor is evaporated; as residue remains the trans-androstandiol.

The alcoholic solutions of the digitonide precipitate are likewise concentrated. The residue is taken up with ether and water; from the ethereal layer is obtained on evaporation the cis-androstandiol; which is about 25 times as physiologically active as the above mentioned trans-androstandiol.

Example 3

100 mg. of a mixture of androsterone and dehydro-androsterone obtained from purified hormone oils as mentioned in Example 1 are dissolved in alcohol and mixed with 250 ccs. of an alcoholic solution containing 0.2% of solanine. After standing for several hours at room temperature the mixture is poured into 1 liter of water; the white flocculent precipitate formed is filtered off, washed with water and dried. It consists of the solanide of the dehydro-androsterone, a trans-androstenolone; its decomposition to the free dehydro-androsterone is effected by treatment with boiling xylene as described in Example 1.

The aqueous alcoholic filtrate of the solanide precipitate is evaporated to dryness and the residue is exhaustively extracted with ether. From the ethereal solution the androsterone is obtained; after recrystallization from dilute alcohol the yield amounts to 44 mg.

Example 4

2 grams of a mixture obtained by completely hydrogenating androstandiones or androstendione are dissolved in 50 ccs. of methylalcohol and 200 ccs. of a hot solution of methylalcohol containing 5% digitonine are added. After standing for several hours the reaction solution is evaporated to dryness and the residue extracted with ether. On evaporating the ethereal solution the so-called cis-androstandiol is obtained. The residue remaining after the extraction with ether contains the digitonide; by treating it with pyridine and ether as described in Example 2 the trans-androstandiol can be isolated.

The progress achieved by the process of the present invention consists in the feature that it enables one to isolate in a convenient and simple manner various hydroxy compounds of the androstane series in pure form from a mixture of the same. These compounds, up to now, could only with difficulty be separated on account of their close chemical relationship. Moreover, by separating a mixture of various hydroxy compounds obtained from natural or synthetic crude material, according to the present invention, a considerable increase in their physiological activity is achieved; for those hydroxy compounds that on addition of a saponine to their solution do not give difficultly soluble addition compounds are usually more active than those that are separated therefrom in the form of difficultly soluble addition compounds. Besides, the physiologically less active hydroxy compounds obtained by decomposing the difficultly soluble addition compounds may be transformed by isomerization processes into substances of higher physiological activity subsequently to the separating process of the present invention. In these isomerization processes also mixtures of isomeric compounds are obtained that can again be subjected to the above described separation process. Thus, it is possible to completely convert, for instance, a less active trans-androsterone by isomerization and separation of the two isomers from the mixture obtained thereby into cis-androsterone of an activity about 7-10 times as high as that of the starting material.

However, instead of using those mixtures that are employed in the examples one may use entirely different starting materials, such as they are obtained in various processes of producing androstan compounds, provided these mixtures contain compounds that are of different stereo chemical constitution, i. e. that contain the cis- and trans-modifications of androstan compounds.

Instead of carrying out the reaction in aqueous ethyl alcoholic solution one may also use alcohol of lower concentration or other alcohols or even other aqueous water-miscible organic solvents. One may even add the saponine in a very finely divided form into the reaction mixture without first dissolving it. Of course, in this case it is necessary to stir the reaction mixture thoroughly. The best results, however, are obtained when using a solution of the starting material and the saponine in 96% ethyl alcohol.

Instead of allowing the saponide to precipitate on prolonged standing of the reaction mixture as described in the Examples 1 and 2 one may also evaporate the solution to partial or complete dryness, whereby in the first case the precipitation of the saponide is facilitated while in the latter case the dry evaporation residue is separated into the saponide and the other components by extraction with a solvent that is only capable of extracting the other components thereby leaving the saponide undissolved. This method is described in Example 4 wherein ether is used as extraction agent. However, other suitable organic solvent may also be employed for this purpose.

A further method of separating the saponide from the reaction mixture consists in precipitating the saponide by diluting the said reaction mixture with a suitable liquid capable of causing precipitation of the saponide. This process is, for instance, described in Example 3, wherein water is used as precipitating agent; but other liquids may likewise be used.

The splitting of the saponide may be carried out with other high boiling liquids than xylene. Instead of pyridine other pyridine bases and the like may be used as it is known to the art. The decomposing of the saponide may also be effected by heating the saponide with organic acid anhydrides, for instance, with acetic acid anhydride, whereby on extracting the decomposition mixture with ether or the like the corresponding ester of the hydroxy compound is obtained.

The purification of the separated androstan compounds may be carried out in any known manner, for instance, by crystallization, distillation and sublimation especially in a high vacuum, by reacting with typical ketone reagents, such as semicarbazide, in case hydroxy ketones are present, or in any other desired manner.

Of course, many other changes and variations in the reaction conditions, the solvents used, the temperatures employed and the like may be made by those skilled in the art in accordance with the principles set forth herein and in the claims annexed hereto.

What we claim is:

1. Process for the separation of hydroxy compounds of the androstane series comprising adding a saponine to a mixture containing hydroxy compounds of the androstan series, and separating the components of the reaction mixture obtained thereby with the aid of the different solubilities of its components.

2. Process according to claim 1 comprising removing from a solution of the reaction mixture the difficultly soluble saponine addition compound formed, decomposing said separated addition compounds and isolating the hydroxy compounds from the decomposition mixture of the saponine addition compound as well as from the solution of the reaction mixture remaining after removing said difficultly soluble addition compound.

3. Process according to claim 1 comprising removing from the reaction mixture that part of the mixture of the hydroxy compounds that has not formed addition compounds with the saponine and isolating the hydroxy compounds contained in said part, and decomposing the addition compound formed and isolating the hydroxy compound contained in the decomposition mixture.

4. Process according to claim 1 wherein the saponine is digitonine.

5. Process for the separation of hydroxy compounds of the androstane series comprising dissolving a mixture containing hydroxy compounds of the androstan series to be separated in an organic solvent, adding a saponine solution to said mixture, separating the precipitated saponine addition compound from the solution, decomposing the addition compound so as to recover the free hydroxy compound therefrom, and isolating the non-reacted components of the starting mixture from the solution remaining after removing the saponine addition compound.

6. Process for the separation of hydroxy compounds of the androstane series comprising dissolving a mixture containing hydroxy compounds of the androstan series to be separated in an organic solvent, adding a saponine solution to said mixture, evaporating said mixture to dryness, extracting the evaporated residue with organic solvent incapable of dissolving the saponine addition compound formed, decomposing the extraction residue so as to recover the free hydroxy compound therefrom, and isolating from the extract the non-reacted components of said starting mixture.

7. Process for the separation of hydroxy compounds of the androstane series comprising dissolving a mixture containing hydroxy compounds of the androstan series to be separated in an organic solvent, adding a saponine solution to said mixture, adding a liquid to the reaction mixture capable of precipitating the saponine addition compound, separating the precipitated saponine addition compound from the solution, decomposing the addition compound so as to recover the free hydroxy compound therefrom, and working up the solution remaining after removing the saponine addition compound so as to isolate therefrom the non-reacted components of said starting mixture.

8. Process according to claim 1 wherein the reaction mixture is a solution in an aqueous water-miscible organic solvent.

9. Process according to claim 1 wherein the mixture to be separated is dissolved in 96% alcohol.

10. Process according to claim 1 wherein the saponine addition compound is decomposed so as to set free the hydroxy compound therefrom, by heating with a high boiling organic solvent.

11. Process according to claim 1 wherein the saponine addition compound is decomposed by heating with xylene.

12. Process according to claim 1 wherein the saponine addition compound is decomposed by reaction with a pyridine base.

13. Process according to claim 1 wherein the saponine addition compound is decomposed by reaction with pyridine.

14. Process according to claim 1 wherein a mixture containing cis- and trans-androsterone is used as starting material.

15. Process according to claim 1 wherein a mixture containing dehydro-androsterone and androsterone is used as starting material.

16. Process according to claim 1 wherein a mixture containing stereo isomeric androstandiols is used as starting material.

17. A saponine addition product of an hydroxy compound of the androstan series.

18. A digitonine addition product of an hydroxy compound of the androstan series.

19. A saponine addition product of dehydroandrosterone.

20. A saponine addition product of trans-androstandiol.

WALTER SCHOELLER.
ARTHUR SERINI.
MAX GEHRKE.
HANS PRIEWE.
LOTHAR STRASSBERGER.
WILLY LOGEMANN.